United States Patent [19]

Pajus et al.

[11] Patent Number: 4,734,790
[45] Date of Patent: Mar. 29, 1988

[54] VIDEO PRINTING PROCESS AND APPARATUS

[75] Inventors: Jean A. Pajus, Ismier; Christiane S. Luneau, Cesson, both of France

[73] Assignees: Etablissement Public de Diffusion dit "Telediffusion de France"; L'Etat Francais le Secretaire d'Etat aux Postes et Telecommunications, both of France

[21] Appl. No.: 861,308

[22] Filed: May 9, 1986

Related U.S. Application Data

[63] Continuation-in-part of Ser. No. 757,192, Jul. 22, 1985, abandoned, which is a continuation of Ser. No. 93,040, Nov. 9, 1979, abandoned.

[30] Foreign Application Priority Data

Nov. 13, 1978 [FR] France ................ 78 32431

[51] Int. Cl.$^4$ .............................................. H04N 5/76
[52] U.S. Cl. .................... 358/310; 358/335; 358/147; 358/256; 358/280
[58] Field of Search ............ 358/310, 335, 345, 142, 358/147, 256, 280, 283, 296–303; 369/59, 32, 33; 340/720; 346/76 R, 76 L, 35, 75, 79, 108, 150, 154, 162, 163, 165, 76 PH

[56] References Cited

U.S. PATENT DOCUMENTS

| | | |
|---|---|---|
| 3,259,690 | 7/1966 | Oshima et al. |
| 3,377,423 | 4/1968 | Lippel ................ 358/138 |
| 4,051,538 | 9/1977 | Fox et al. ............ 358/296 |
| 4,148,066 | 4/1979 | Saylor ................ 358/296 |
| 4,165,520 | 8/1979 | Wenler et al. ........ 358/903 |
| 4,199,784 | 4/1980 | Wellendorf et al. ... 358/296 |
| 4,233,628 | 11/1980 | Ciciora ............... 358/147 |
| 4,279,199 | 7/1981 | Blanco et al. ........ 400/57 X |

FOREIGN PATENT DOCUMENTS 2309091 11/1976 France.

Primary Examiner—Robert L. Richardson
Attorney, Agent, or Firm—Laff, Whitesel, Conte & Saret

[57] ABSTRACT

A multiple printing head, having k print points responds to binary samples which represent a grid of points, that are continuously repeated. The m horizontal lines correspond to television lines, each line comprising n points.

The vertical lines formed by the grid points are grouped to form n/k columns, each comprising k vertical lines. The point bits are transmitted to the printing head by the point bits of the first line and the last column, then by the point bits of the second line and the last column, and so on up to those of the $m^{th}$ line and the last column. The point bits of the first line and the last but one column are transmitted to the said printing head, then those of the second line and the last but one column, and so on up to those of the $m^{th}$ lines and the last but one column, then the actual support is again shifted as previously. Those transmission operations for the point bits, interrupted by head shifts, are repeated column by column up to print the points of the $m^{th}$ line of the first column. In the course of the bit transmission to the printing head, the point bits pass through a buffer memory from which they are read out to the printing head. The write operation is performed line by line in selecting the point bits belonging to the column under printing and to the line that follows the one whose point bits have just been written into the buffer memory. The selection of the data to be written is made either in the same frame of video signals or in different frames.

7 Claims, 4 Drawing Figures

FIG.1

FIG.2 INTERFACE CIRCUIT

VIDEO PRINTING PROCESS AND APPARATUS

This is a continuation-in-part of U.S. Ser. No. 757,192, filed July 22, 1985, and now abandoned, which in turn, was a continuation of U.S. Ser. No. 093,040, filed Nov. 9, 1979, now abandoned.

The present invention relates to a process for registering, on an actual two-dimensional support, a picture displayed on a television screen. It also relates to means for implementing that process. More particularly it relates to the printing on a support media (such as paper) of synthetic television pictures, such as pictures including texts or diagrams.

Presently, several companies are organizing teletext services, that is information services wherein text or diagram pages are broadcasted to public subscribers or to certain groups of subscribers. Those text or diagram pages possibly include maps or similar information which is digitally transmitted and displayed on a television set screen. Among such teletext services, one may cite the ANTIOPE SYSTEM, developed in France, a description of which may be found in the French Technical Review "Radiodiffusion-Télévision", No. 40, 1975, pages—23; The CEEFAX system, developed in the United-Kingdom, a description of which may be found in the English review "GEC Journal of Science & Technology", Vol. 41, No. 4, 1974, pages 117–124; the ORACLE system, similar to the last mentioned one, the VIEWDATA, a description of which may be found in the article entitled "View data" par S. Fedida published in the review "Wireless World", April 1977; and the TIC TAC system, a description of which may be found in the French article entitled "TIC TAC un terminal domestique" by C. Carouge, published in the French review "Revue 2000" No. 38, pages 20 and 21.

In those teletext systems, the elementary characters to be displayed constitute text lines on the screen which are enclosed in horizontally and vertically side-by-side rectangles. Graphic characters are also provided for displaying curves or diagrams. They are obtained by dividing a rectangle into six elementary blocks that are independently operated. The lit blocks of a given rectangle have a uniform color while the background (i.e. the unlit blocks in the rectangle) are of another color. The resulting colored areas are useful for drawing maps, for instance.

The transmission codes for written characters and graphic characters are defined according to international standards, such that the standard ISO 646.

From the above, teletext services are able to provide to the public, or at least subscribers, with numerous selectable data. However, for any user that information is only accessible by watching a television screen. In numerous circumstances, the registration of those data onto a support, such as a paper sheet, would be desired.

An object of the present invention is to provide a process for registering or otherwise forming on an actual two-dimensional support a steady picture which is displayed on the screen of a television set, a CRT tube or more generally an apparatus for processing video signals.

Another purpose of the present invention is to provide a monochrome registration capable of providing the appearance of the colors of graphic areas formed by side-by-side blocks. This appearance is achieved by varying the density of monochromatic points when printing them onto the actual support.

Another purpose of the present invention is to provide a registration process for enabling the use of a matrix printing machine capable of simultaneously printing a plurality of points.

In the technical field regarding the actual picture printing on a two-dimensional support by using multi-point printing heads, one may cite the French Pat. No. 2,309,091. That patent describes a system wherein, at the transmission station, a strip of photodiodes is moved in the line direction, the strip movement direction being normal to the line direction. The data collected by the strip photodiodes are grouped by line in registers $S_1$-$S_k$ (or $S_{k+1}$-$S_{2k}$). (The term "pixel" is another word for the term "point" which is used in this specification). Then, the data are transmitted line by line. At the reception station, the data of k lines are stored. Then, they are read out for feeding a multiple printing head, the orientation of which is normal to the lines. In short, in that known system, information is transmitted line by line and the write head and read head move parallel to the lines. However, that known system would permit the transfer of teletext data only if, before printing the digital data regarding a number of lines equal to the number of the printing head, points information have been stored. This leads to a use large memories which are expensive, with regard to the acceptable costs of a subscriber apparatus. In addition, it would need a printing head capable of printing about 400 points in the tranverse direction, which can only be made with a very expensive printing machine.

An object of this invention is to provide a registration process for overcoming those drawbacks.

According to a feature of the present invention, a process is provided for registering or otherwise forming a steady television picture onto an actual two-dimensional support, by means of a multiple printing head having k print points. The video picture signals are continuously converted into a binary code, the samples of which representing a grid of points, that are continuously repeated. The m horizontal lines correspond to the television lines, each line comprising n points. The vertical lines are grouped to form n/k columns each comprising k vertical lines. The point binary data is transmitted to the printing head in the beginning by the point binary data of the first horizontal line and the last column. Then, those of the second horizontal line and the last column are transmitted, and so on, up to those of the $m^{th}$ line and the last column. The actual support is then shifted along its length by a distance corresponding to the width of the printing head; then the point binary data of the first line and the last but one column are transmitted to the said printing head. Next to be transmitted is data relating to the second line and the last but one column, and so on up to those $m^{th}$ lines and the last but one column. The actual support is again shifted as previously, and the transmission operation for the point binary data, interrupted by head shifts, are repeated column by column to print the point binary data of the $m^{th}$ line of the first column.

According to another feature, in the course of the binary data transmission to the printing head, the binary data pass through a buffer memory from which they are read out to the printing head. A binary data write operation is performed line by line in selecting the point binary data belonging to the column being printed and to the line that follows the one whose point binary data have just been written into the buffer memory. The selection of the data to be written is made either in the same frame of video signals or in different frames.

According to another feature, when the registration process applies to pictures, including colored areas, the colors of which are determined by combination of primary colors that are separately converted into binary code, each digital data of a primary color is converted according to an algorithm $A_i^j$, wherein j identifies the primary color and i is the rank of the point in a horizontal line. The conversion is into a binary signal that is ORed with the converted binary signals corresponding to the other primary color data of the same point, before being printed.

According to another feature, from one horizontal line to the next one, the algorithm $A_i^j$ varies as a function of i.

According to another feature, a system registers onto an actual two-dimensional support a steady television picture. The system continuously digitizes the video signals of the picture. The television signal is separated from the line sync and the frame sync. A k-stage shift register has a data serial input which is connected from output digitizing means and parallel outputs are connected to respective inputs of a buffer memory, having independently controlled input and output operations. The buffer memory data outputs are connected to a data input of the printing machine, having a printing head provided with k points. A two-input AND gate has one input for receiving the clock signals and an other input connected from the output of a first comparator means, one input of the first comparator means being connected to a data output terminal of a first column counter. The other input of the comparator or means is connected from the data output of a second column counter. The input of the first column counter is connected from the overflow output of a cyclic k-stage counter, fed with the digitizing clock signals. The input of the second column counter is connected to detecting means for detecting an actual support shift in the printing machine. A first line counter has a data input which receives line sync. The data output of the counter is connected to one input of a second comparator means whose output is connected to one input of a 3-input AND gate, having a second input connected to the output of the first comparator means and a third input connected to the idle output of the the buffer memory. The 3-input AND gate output is connected to the write control input of the buffer memory and to the second line counter input. The buffer memory has an output for indicating the partial busy condition of the memory and it is connected to the start control input of the printing machine. A read output is connected to the read control output of the printing machine. The reset inputs of the first column counter and a cyclic point counter are fed with a line sync, and reset counter of the first line counter is fed with a frame sync.

According to another feature, the system comprises a buffer memory alternatively operating either in a write mode for storing the data corresponding to a column or an integer number of columns, or in a read mode to feed the printing machine. A line counter has a data output which is connected to the write addressing input of the buffer memory. An overflow output of the buffer memory is connected to a write-read switching circuit for triggering the switch into the read mode and to give the start operation for the printing machine, the write-read switching circuit being switched back by the detecting means detecting the shift of the actual support in the printing machine for switching the buffer memory to the read mode and resetting the line counter.

According to another feature, for processing a colored television picture, digitizing means further sample the chrominance signals to deliver three primary colour binary data, in addition to the luminance bits. The primary colour outputs from the digitizing means are connected to corresponding horizontal inputs of a matrix converter circuit having n vertical control inputs. Crosspoints are selectively located in the converter circuit matrix at certain selected crossings between horizontal and vertical lines. Each crosspoint connects the input coupled to the concerned horizontal line to the converter circuit output when the control input which is coupled to the concerned vertical line is set. The vertical control inputs is respectively connected from parallel outputs of an n-stage shift register whose clock input is connected from the output of a second 2-input AND gate. One input of this gate receives digitizing clock signals and the other input is connected from the output of a programmable delay register, having an enable input terminal for receiving a line sync, a clock input for receiving digitizing clock signals and a manually controlled input. The n-stage shift register further has an initialization input receiving frame sync. The matrix converter circuit output is connected to one input of a third 2-input AND gate, having its other input, connected from a control input and its output connected to one input of a 2-input OR gate. The control input is connected, via an inverter, to a fourth 2-input AND gate having its other input connected to luminance output of a digitizing means and the output connected to the other input of said 2-input OR gate, whose output is connected to the serial input of the k-stage shift register.

From the above, it will appear, according to this invention, that television picture information signal is transmitted line by line, but they are processed in the direction normal to the television lines, that is column by column. This means that information are transmitted horizontal line by horizontal line, but the printing head moves in a direction normal to the horizontal lines and is oriented along the lines. As a result, there is a rotation of 90°.

The above mentioned features of the present invention, as well as others, will appear more clearly from the following description of an embodiment, the description being made in conjunction with the accompanying drawings, wherein.

Figure 1:
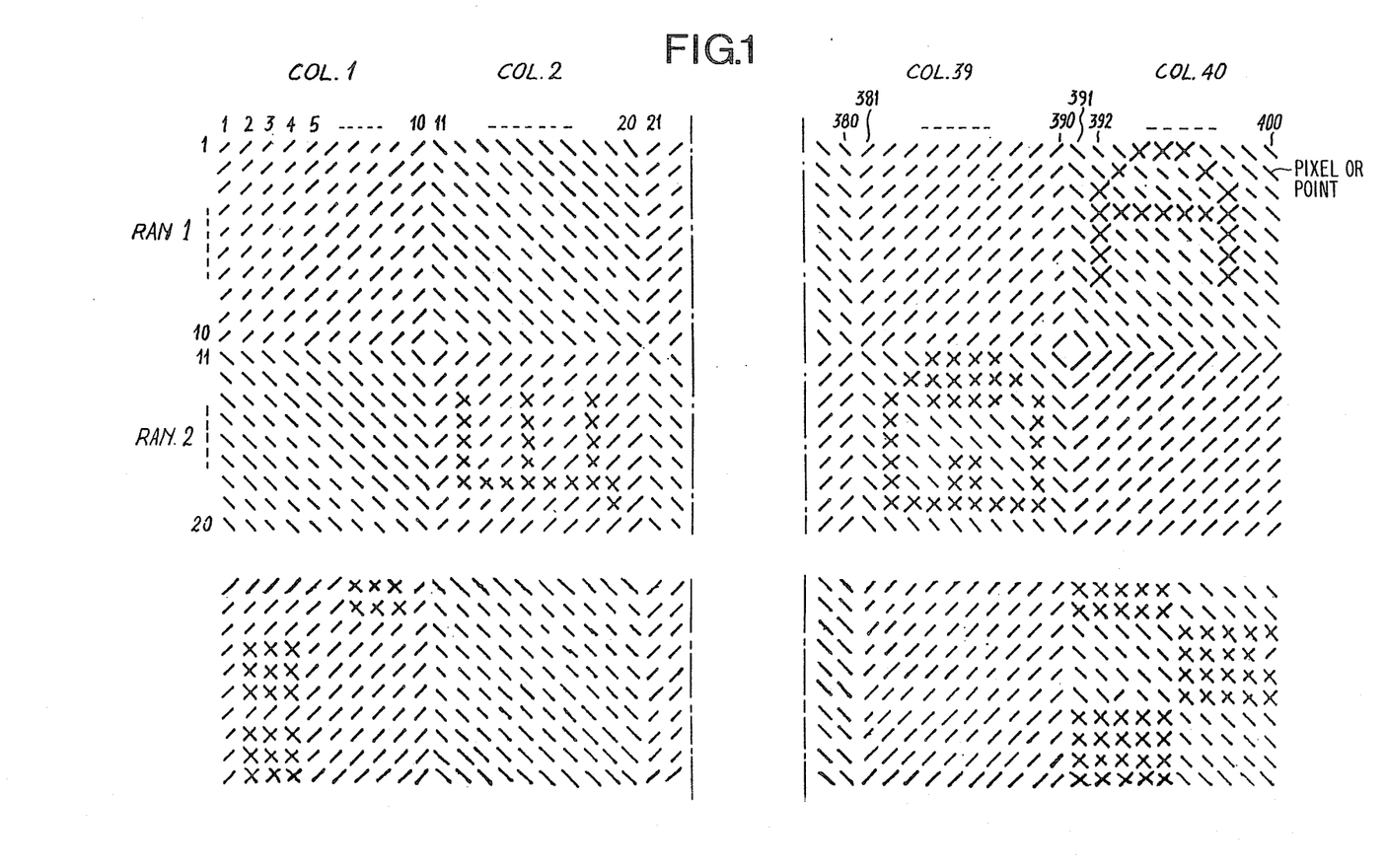
FIG. 1 is a schematic illustration of the display area on the screen of a television receiver set, which illustrates the recording and printing process according to this invention.

In FIG. 1, the oblique dashes represent the points which, in teletext systems as above described, are lit or unlit to display the picture which is to be shown. The set of those display area points is divided in blocks or squares of ten by ten points. From one block to the next one, the orientation of the oblique dashes changes. Each block may be identified by two coordinates, the horizontal row coordinate and the vertical column coordinate to which it belongs.

First, an assumption will be made that the concerned television picture is monochrome, a lit point being white and an unlit point being black. By way of illustration, an assumption is also made that the display area includes 25 rows of blocks and each row includes 40 blocks, which corresponds to 40 columns. The rows are numbered from RAN 1 to RAN 25 and the columns from COL 1 to COL 40.

In addition, it is assumed that the utilized printing machine has a printing head including 10 aligned points, which means a machine having a printing head provided with 10 pins or electrodes or any other device capable of printing a point, the number 10 being considered by way of example. That number may without any trouble be different from the block format. In fact, pratical machines are available with 7, 8, 12, 24, printing electrodes, and so on.

Furthermore, it is assumed that the printing operation is implemented by moving the head in a direction normal to the line defined by the pins or other printing devices.

That printing is head moved with a periodic printing operation which makes it possible to register the data contained in a 10-point wide column onto an appropriate substrat. Finally, the machine has a paper stepping mechanism, the paper step being equal to the width of a column. After having printed each column by moving the printing head, the paper is moved by one step while the head is reset to its initial position in order to print edge-to-edge columns.

A machine may also be used wherein the paper continuously moves in a direction normal to the printing head movement, that machine comprising several printing heads so that when one head has completed its printing operation, the next one is ready to begin a printing operation for describing the next column.

In the following, a picture will be considered wherein each line includes 400 points and each column includes 250 points. For transferring the picture displayed on the television screen, the ten bits 391–400 of the first line are successively transmitted to the printing machine head, then the bits 391–400 of the second line are transmitted, and so on, up to the transmission of the bits 391–400 of the 250th line. When the printing machine has printed the 10 points of the 250th line, the printing head is moved back in front of the first line and the paper moves by one step. Then the 10 bits 381–390 of the first line are successively transmitted to the printing head; then the 10 bits 381–390 of the second line are transmitted, and so on, up to the transmission of the point 1–10 of the 250th line.

The printing machine operating speed is substantially slower than the television screen sweep speed so that a buffer memory is connected to the printing machine for receiving the bits by packets of 10 bits, the packets being read out by the printing machine at its proper rate. In the described embodiment, the buffer memory is a FiFo memory.

Two operation modes are usable for the buffer memory. In the first operation mode, information input and output are independant. The full or not full condition of the memory must be known to authorize or not authorize the input of data. The capacity is computed as a function of the data input rate (screen sweep rate, data displayed in each frame) and output rate (machine print rate for each run, number of point rows to be printed in each run). In the second operation mode, the input and output operations are connected. The buffer memory is loaded with all the data needed for printing a complete point row, that parameter fully determing the capacity of the memory. A choice between the two operation mode results from a balance between the cost and the simplicity of the device.

A circuit also can select, column by column, the data packets to be transmitted to the memory. Practically, the paper stepping mechanism, associated with a counter, designates the column from which the packets are to be transmitted line by line.

From the above, it clearly appears that the process according to this invention permits a conversion of a television-type line-by-line iterative scanning into a unique wide column-by-column scanning that is normal to the line-by-line scanning.

Figure 2:
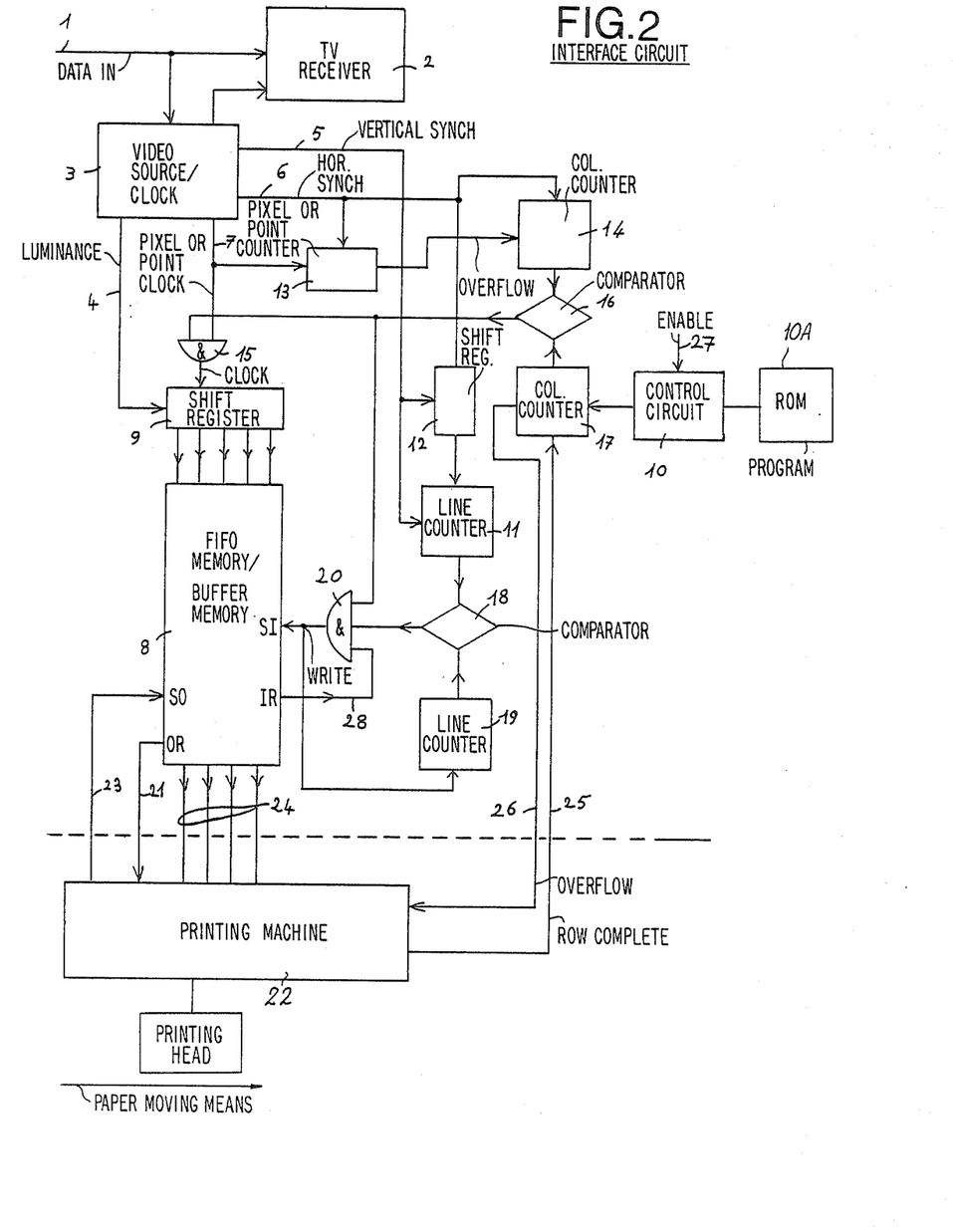
FIG. 2 is a block-diagram of an interface circuit that is connected from the video terminal of a television receiver set to a printing machine, and used to implement the process according to this invention.

FIG. 2 is a block-diagram of circuits for implementing the transfer process according to this invention. Data to be displayed are applied from terminal 1, on the one hand, to a television receiver set 2 and, on the other hand to a circuit 3 the function of which will be described hereunder.

The video source 3 includes any suitable clocking system for synchronizing circuit operations. That source 3 may be similar to video source 12, which is shown in U.S. Pat. No. 4,165,520, and which is used to drive a monitor 32. That video source 12 has four output signals, three of which appear on lines 16, 18, 20 and correspond to signals appearing on wires 5, 6 and 7 in FIGS. 2, 3 of the present drawings.

Data to be display may have various forms. For instance, they may be under the form of a synthetic trichrome or monochrome video signal including or not including the line and frame syncs signals. The purpose of circuit 3 is to produce from the applied data all of the following binary signals: luminance bits delivered to wire 4, frame sync delivered to wire 5, line sync delivered to wire 6, and synthetic picture sample clock delivered to wire 7.

The elementary circuits included in circuit 3 are known and not part of this invention. The luminance signal delivered to wire 4 is a sequence of "1" and "0" depending on whether the corresponding point is white or black.

Figures 3, 3A:
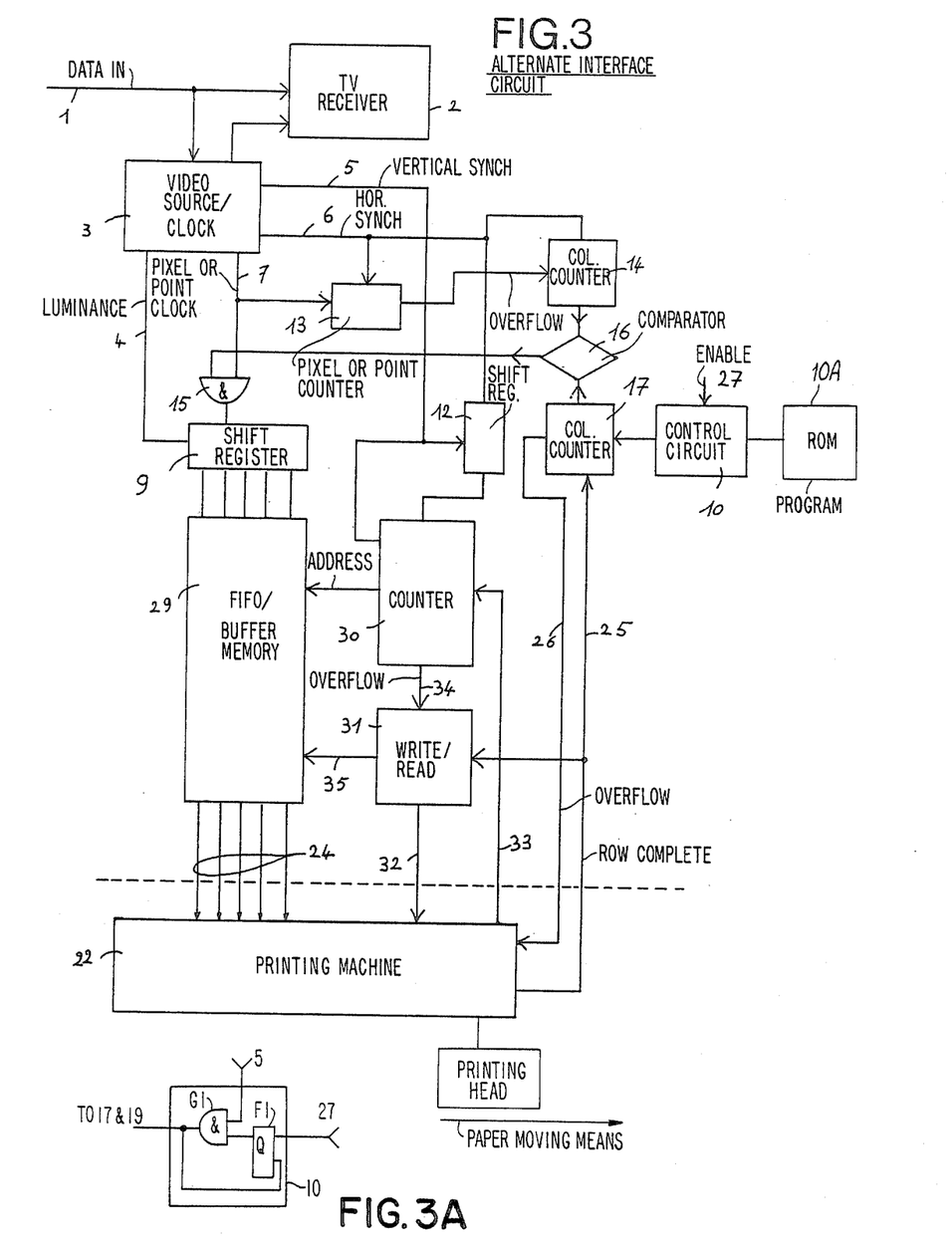
FIG. 3 is a block-diagram of an alternative of the interface circuit shown in FIG. 2.
FIG. 3A shows an AND gate and latch circuit which may be used to complete box 10 in FIGS. 2 and 3.

FIG. 3A shows a simple version of the contents of box 10. There is an AND gate G1 and a flip-flop F1, with output Q. One input of the AND gate G1 is connected to be energized in response to the vertical synchronization pulse on wire 5 and the other input is connected to be energized by the signal on the enable wire 27. The flip-flop F1 operates in response to a start signal appearing on the enable wire 27 to place a signal on output terminal Q. When the AND gate conducts, the counters 17 and 19, and the flip-flop F1 are reset. An output from the gate G1 resets the flip-flop F1.

The interface circuit shown in FIG. 2 comprises a buffer memory whose data inputs and outputs are independently controlled. Memory 8 is a FiFo memory (a first-in-first-out memory) which is a known device. A FiFo memory has two control inputs and two control outputs: an output OR means "output ready", an input SO means "shift out", an output IR means "input ready" and an input SI means "shift in". In the inventive circuit, the "output ready" output of FiFo memory 8 (FIG. 2) is connected to wire 21, which means that as long as the FiFo memory is not empty, wire 21 enables the printing machine to read out bytes from it; input "shift out" is connected to wire 23 which means that the printing machine clocks the FiFo memory to read its contents byte-by-byte; the "input ready" output is connected to the third input of AND gate 20 which enables it to write a byte from shift register 9 into the FiFo memory 8 as long as the FiFo memory is not full; and the "shift in" input is connected to the output of AND gate 20 which is "on" when three conditions are fulfilled.

Output 4 of circuit 3 is connected to the data serial input of a shift register 9 whose parallel outputs are connected to the data inputs of memory 8. Output 5 of circuit 3 is connected, on the one hand, to the initialization input of a control circuit 10, on the other hand, to the reset input of a line counter 11 and, finally, to the reset input of a shift register 12. Output 6 of circuit 3 is connected, on the one hand, to the reset input of a point counter 13, on the other hand, to the reset input of 20 column counter 14, and, finally, to the serial input of shift register 12. Output 7 of circuit 3 is connected, on the one hand, to data input of counter 33 and, on the other hand, to the first input of an AND gate 15 whose output is connected to the clock input of shift register 9.

The read only memory 10A contains a stored program which is read out responsive to a "start" signal applied to the enable wire 27. This stored program includes all instructions which are necessary to set all circuits to a zero or start condition and then to follow through during the operation of the circuit. It is irrelevant whether the start condition is applied to wire 27 manually or responsive to a sequencing condition of circuit operations.

The counter, 13 is a cyclic counter the maximum capacity of which is equal to the number of pins of the printing head fed by the interface circuit. That is a capacity of 10 points in the described embodiment. An overflow output of counter 13 is conected to control input of counter 14. The data output of counter 14 is connected to the first input of a comparator circuit 16 whose second input is connected from data output of a second circuit 17. The output of comparator 16 is connected to the second input of AND gate 15.

The register 12 is a plain shift register operating as a delay line in order to transmit to counter 11 a line sync signal, with a certain delay which defines the top margin from which the picture is to be displayed. The output of register 12 is also connected to line counter 11 has a maximum capacity equal to the number of the line of the portion of picture which is to be displayed, i.e. 250 lines in the described example. The data output of the line counter 11 is connected to the first input of a second comparator circuit 18 whose second input is connected from the data output of a line counter 19. The output of counter 19 is connected to the first input of a 3-input AND gate 20. The second input of AND gate 20 is connected to the output of comparator circuit 16 and a third input thereof is connected to the control output of memory 8, for indicating that memory 8 is not full. The output of gate 20 is connected, on the one hand, to write control input of memory 8 and, on the other hand, to signal input of counter 19. The counter 19 has a capacity of 250 and its contents indicates the line number of the displayed picture points which the last ones written into memory 8.

As soon as the point data have been written into memory 8, it sets a signal on its output 21, that is connected to the control input of the printing machine 22. Output 23 of printing machine 22 is connected to read control input of memory 8. The data output 24 of memory 8 is connected to the data input of printing machine 22. Printing machine 22 still has an output 25 that is set each time the printing machine head has completed the print operation of a row, which row corresponds to a television picture column. Output 25 is connected to the signal input of counter 17 whose overflow output is connected to input 26 of printing machine 22 and is set when counter 17 overflows. That overflow signal indicates that the 40 columns have been printed and the printing machine must stop.

Circuit 10 has a control input 27 that may be set by an operator, and an output connected to initialization input of counter 17.

The operation of the interface circuit shown in FIG. 2 will now be described, assuming that every counter or register, as well as memory 8, is empty at the initial time.

The operator actuates the key setting input 27 of circuit 10. Column counter 17 is reset. Thus a data output from 17 to 16 delivers "39". Furthermore, the contents of counter 19 is "1" for indicating that the first points to be written into memory 8 must belong to the television line No. 1 of the displayed picture.

After the frame sync has been delivered from wire 5, during the top margin lines, there will be an equality in comparator circuit 16 for any points of the column No. 39. Then, one input of gate 20 is set. However, as counter 11 as at "0" and does not yet received any signal through shift register 12, there is no equality in comparator circuit 18 so that gate 20 cannot authorize data to be written into memory 8.

As soon as circuit 12 delivers a signal to line counter 11, there is an equality in comparator 18 and control output 28 of memory 8 indicates that memory 8 is not full. When there is an equality between the two column outputs 14 and 17, that is when counter 13 has counted 10 clock points after having been reset by a signal on wire 6, the output of comparator circuit 16 opens gate 20 which causes the parallel write into buffer memory 8 of the contents of register A. At that time, register 9 contains the data of the points 391–400 of the line No. 1 which are stored in memory 8. Counter 19 is turned to condition "2". Thus, at the next line, that is line No. 2, there will be again an equality in comparators 16 and 18, and the operation is resumed. When memory 8 is full, for instance after having received the data concerning 20 lines, output 28 inhibits gate 20. Thus write is stopped, but register 19 contains the number of the next line to write.

For that time duration, in an independent manner, output 21 of memory 8 has been set so that the printing machine 22 controls, through its output 23, the read out of data from output 24 of memory 8. Practically, the printing machine clocks the read out of the data through wire 23.

As soon as memory 8 is no longer full, there is in the course of a television frame, a new equality in comparator 18 between the contents of line counters 11 and 19. Thus the data of the corresponding line are written into memory 8. The process continues up to the writing of the 250th line, as far as points 391–400 are concerned, into printing machine 22. At that time, output 25 is set which decrements and drives down counter 17 and which sets the contents of counter 19 to "1".

The initial conditions are then restored, but counter 17 now contains "38". Thus comparator circuit 16 will produce a positive result only when points 381-390 are stored in register 9. Then, the printing of column 39 will be processed, and so on.

When column "1" has been printed by machine 22, reset output 26 of counter 17 turns the printing machine out.

The interface circuit shown in FIG. 3 comprises the same input circuits for writing into the buffer memory 10 as those shown in FIG. 2. However the independent write read control memory 8 is changed into a memory 29 that can store all the data concerning a column, i.e. 2500 points, or concering a integer number of columns, before beginning to be read out. The data input of memory 29 is connected to output of register 9. Instead of line counter 11, FIG. 3 has a counter 30 that counts signals transmitted from shift register 12 and has data outputs connected to addressing inputs of memory 29 that stores data delivered from shift register 9 each time that comparator 16 has a coincidence with addresses delivered from 30. Comparator circuit 16 sets register 9 through gate 15.

Counter 30 has an overflow output 34 that is connected to a write-read switching circuit 31. When circuit 31 turned on, it causes, through output 35, memory 29 to switch to read operation, and, through output 32, indicates to printing machine 22 that it can start its printing operation. Through wire 33, printing machine 22 increment counter 30 in order to address the data to be read out from memory 29 and sent to printing machine 22 through link 24. At the end of the printing of a column, printing machine 22 increments, through wire 25, column counter 19 and switches circuit 31 into its write condition. Then counter 30 is reset via wire 33 and the data of the next column may be written into memory 29 in view of the next printing, and so on, up to the end of the printing of the last column, which is indicated by an overflow of counter 17.

Figure 4:
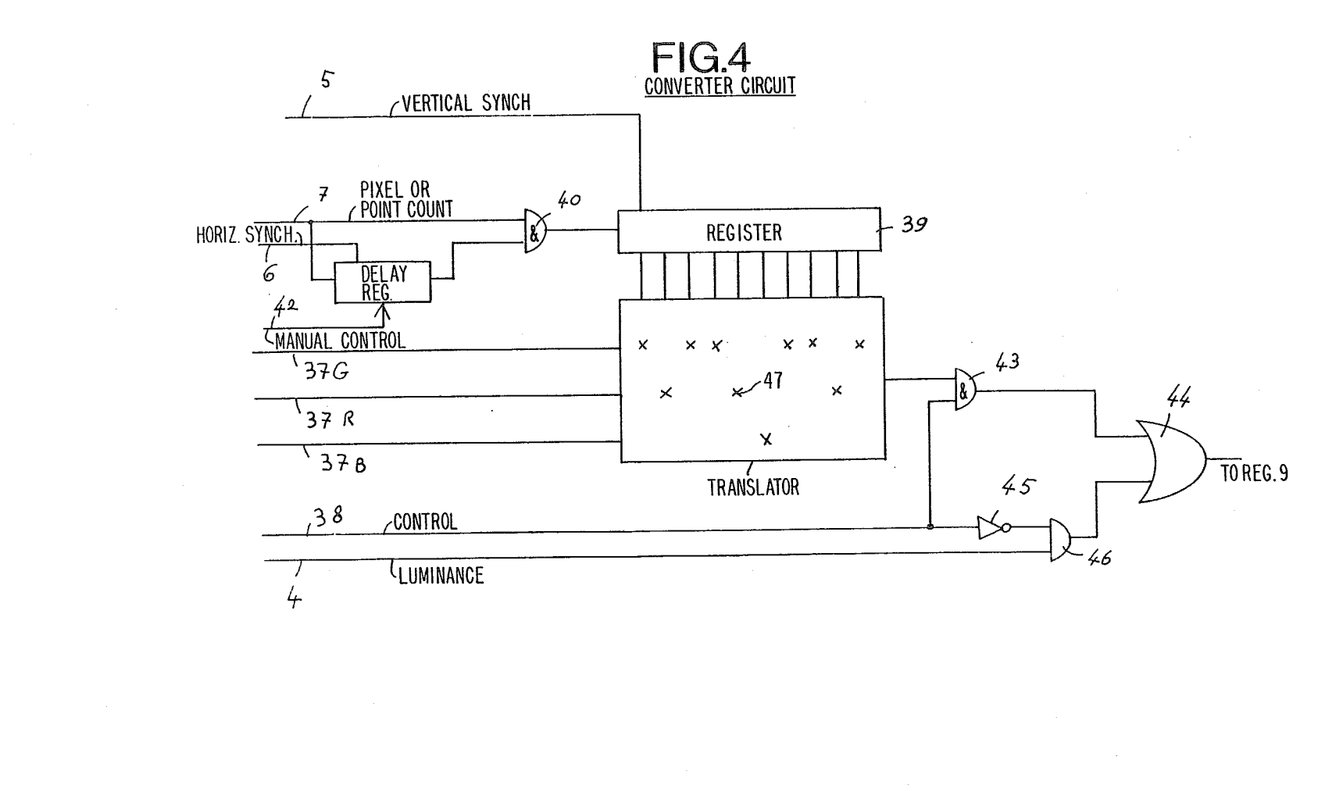
FIG. 4 is a diagram of a converter circuit usable in either the interface circuit shown in FIG. 2 or FIG. 3.

FIG. 4 shows in a detailed manner a processing circuit that may be coupled into either interface circuit shown in FIG. 2 or 3, from a signal output of circuit 3 to a signal input of register 9, This enables a transfer to the printable support of the printing machine 22 of information concerning colored areas of the television picture. Such a processing circuit comprises an input wire 4 connected to the corresponding output of data distributor 3 for transmitting the binary luminance signal, and three wires 37G, 37R and 37B for respectively transmitting binary chrominance signals, i.e. green, red and blue. Still it comprises a control wire 38 to which is applied an input signal "1" when the data to be transferred into the picture writing machine 22 are relative to colored areas, or an input signal "0" in the reverse case. In the following, there will be described how the binary condition of the signal applied to wire 38 is determined. In addition, the processing circuit is connected to wires 5, 6 and 7, FIGS. 2 and 3, to receive frame sync, line sync and point clock pulses.

The wires 37G, 37R and 37B are respectively connected to three horizontal inputs of a translator circuit 36 that has ten vertical control inputs respectively connected from ten outputs of a 10-stage register 39. The clock input of register 39 is connected from the output of an AND gate 40 whose first input is connected from wire 7 for applying the point clock pulses. The AND gate 40 has a second input which is connected from the output of a programmable delay register 41, whose enable input which receives line sync via wire 6 and a clock input which receives the point clock from conductor 7. The register 41 still has a manually controllable input 42, the purpose of which will be hereunder described. The register 39 still has an initialization input for receiving the frame sync from wire 5.

Furthermore, the output of the translator circuit 36 is connected to the first input of AND gate 43 whose second input is connected from control input 38 and output is connected to one input of an OR gate 44. Input 38 is connected, through an inverter 45, to the first input of an AND gate 46 whose second input is connected from luminance input 4 and output is connected to the other input of OR gate 44. The output of OR gate 44 is connected to the signal input of register 9, FIG. 2 or FIG. 3.

The translator circuit 36 is comprised of matrix of crosspoints 47 which are selectively located at certain crossing of horizontal lines aligned with wires 37G, 37R, 37B and of vertical lines aligned with the parallel output wires from register 39. Each time a horizontal line and a vertical line are simultaneously enabled and when there is a crosspoint at the crossing of those two lines, the translator circuit 36 delivers a signal to gate 43. Pratically the crosspoints may be 2-input AND gates whose outputs are ORed through an OR gate, not shown, whose output corresponds to the output of circuit 36.

The operation of register 39 is such that only one of its output wires is set at each point clock signal. The transition from a point clock signal to the next one shifts the set condition of an output wire to the next one.

As register 41 has a programmable delay, it allows a programmable number of point clock pulses to pass through gate 40, after each last picture point in a line. Thus, from one line to the other, a shift is created in the register 39. Assuming that such a shift is equal to a stage, it is equivalent to delaying by one stage the vertical input scanning of translator circuit 36.

The distribution of the crosspoints in the horizontal lines of translator 36, which is shown by way of example in FIG. 4, corresponds to the indications mentioned in the following Table. Those indications are relative to the eight colors to be considered and to the ten-point areas. The binary codes mentioned under the color names indicate the conditions of wires 37G, 37R and 37B. The figures in the column "register 39" indicate the numbers of its outputs. In the Table, "1" indicates that the corresponding point is to be printed in black by the printing machine 22, which corresponds to a signal delivered from translator 36, and "0" indicates that the corresponding point must appear white on the paper sheet of printer 22, which corresponds to no delivery from translator 36.

TABLE

| Register 39 outputs | Colors | | | | | | | |
|---|---|---|---|---|---|---|---|---|
| | Black 000 | Blue 001 | Red 010 | Magenta 011 | Green 100 | Cyan 101 | Yellow 110 | White 111 |
| 0 | 1 | 1 | 1 | 1 | 0 | 0 | 0 | 0 |
| 1 | 1 | 1 | 0 | 0 | 1 | 1 | 0 | 0 |

TABLE-continued

| Register 39 outputs | Colors | | | | | | | |
|---|---|---|---|---|---|---|---|---|
| | Black 000 | Blue 001 | Red 010 | Magenta 011 | Green 100 | Cyan 101 | Yellow 110 | White 111 |
| 2 | 1 | 1 | 1 | 1 | 0 | 0 | 0 | 0 |
| 3 | 1 | 1 | 1 | 1 | 0 | 0 | 0 | 0 |
| 4 | 1 | 1 | 0 | 0 | 1 | 1 | 0 | 0 |
| 5 | 1 | 0 | 1 | 0 | 1 | 0 | 1 | 0 |
| 6 | 1 | 1 | 1 | 1 | 0 | 0 | 0 | 0 |
| 7 | 1 | 1 | 1 | 1 | 0 | 0 | 0 | 0 |
| 8 | 1 | 1 | 0 | 0 | 1 | 1 | 0 | 0 |
| 9 | 1 | 1 | 1 | 1 | 0 | 0 | 0 | 0 |

It must be understood that the selection of eight colors is arbitrary. It may be a greater number of colors by providing more than three horizontal input wires to translator circuit 36. In addition, a ten-point register 39 has been selected which corresponds to ten-point areas, but obviously any arbitrary number different than 10 may be selected for the number of the vertical input to translator 36. Particularly, the number of vertical inputs to translator 36 does not depends on the number of points corresponding to the width of a column.

In addition, it is to be noted that the value of the above Table leads to the following relative black densities with the eight colors: black, 100%; blue, 90%; red, 70%; magenta, 60%; green, 40%; cyan, 30%; yellow, 10% and white, 0%; those density values being closed to those used to display colored pictures in black-and-white television. Those densities might easily be changed by modifying the locations of "1" and in the above Table which practically results in a redistribution of the crosspoints in the translator circuit 36.

Still to be noted the circuits associated with buffer memory 8 or 29, in FIG. 2 or 3, as well as those associated with matrix converter circuit 36 in FIG. 4, may be replaced by other circuits having the same functions, but a more up-to-date technology may be used than that of the shown elementary circuits. Thus instead of register 39, a 4-stage binary counter may be associated with the code converter. In a more general manner, the logic operations performed by those logic circuits may be performed by utilizing microprocessor techniques.

As shown in the above Table, the system according to this invention and particularly the system shown in FIG. 4 permit a use of a number of colors by presenting a different ratio of black and white points for each color. That operation is performed by the matrix converter circuit 36. However, without any care it appears that for the same color, over a substantial vertical extent, all the white points would be vertically aligned as well as the black points respectively which results in a print which is not pleasant to look at. Consequently, by means of circuit 41, there is provided from one line to the next one a delay which results in suppressing the vertical stripes. But, it is still to be noted that any shift from a line to the next one cannot be used because some shifts generate a moire picture. Indeed, it has been experienced that a shift from one line to the next one must be determine by taking into account the number of the colors to be rendered and the number of points in register 39.

As already mentioned, the condition of input 38 in FIG. 4 determines whether there are colored areas with colors to be rendered. When input 38 is a "0", the circuit shown in FIG. 4 is transparent, which means that the printing machine prints the point according to the bits transmitted from wire 4 either the bit sequence describes characters or uniformly colored areas. When input 38 is a "1", the circuit shown in FIG. 4 determines the point to be printed or not printed by the printing machine from the colors of the colored television picture areas.

Practically, when input 1 is connected from an ANTIOPE teletext system receiver, as mentioned in the preamble, the condition of input 38 is obtained in the teletext system receiver from transmitted data and teletext system function codes. The same would be true with other mentioned teletext system.

It is to be noted that in the above description, a prints 1 machine normally printing from left to right, as has been considered, which means that the $39^{th}$ column is first printed, the $38^{th}$, and so on. Obviously the system according to this invention would also apply to a printing machine printing from right to left, by first printing the 1st column, then the 2nd column, and so on. Then it would suffice to invert the operation of counter 17.

It is still to be noted that the registration process, in an embodiment shown in FIG. 4 and concerned colored areas the colors of which are determined by primary color combination, digitized primary color data are associated with each paint. For each point each primary color bit is connected according to an algorithm $A_i^j$, wherein j identifies the primary color and i is the rank of the point in a television line. The signals are converted into a bit "1" or "0" which is ORed with the converted bits concerning the other primary colors of the same point before being printed. In FIG. 4, the algorithm for each primary color is implemented by a matrix line in the converter circuit 36. As that matrix line includes a limited number r of points, r being in the particular case equal to 10, there is the equality $A_i^j = A_{i+r}^j$.

Furthermore the shift from one line to the next one generated by register 39 may be expressed by the fact that the algorithm $A_i^j$ varies as a function of i from one line to the next one. By way of example, the following relation may be selected:

$$A_i^j(m) = A_{i-1}^j(m-1)$$

wherein m is the number of a line. However, that relation is not limitative and others may be selected when they look more pleasant.

As hereabove mentioned it also to be noted that r may be different of the number k of vertical lines forming a column.

What is claimed is:

1. A process for printing two-dimensional images responsive to video signals by means of a multiple point printing head having k print points, the process comprising the steps of:
   (1) continuously converting said video signals into continuously repeated binary code signals representing a grid of points, wherein said grid has m horizontal lines corresponding to the lines of a television picture, each horizontal line having a length comprising n points, (2) grouping vertical lines of said grid into form n/k columns, each of said columns comprising k vertical lines, (3) reading out point data to said printing head (a) beginning with the point binary data of a first line in a last column, (b) then the point binary data of a second line in the last column, and (c) so on up to the point binary data of an $m^{th}$ line in the last column, (4) shifting the printing head by a length corresponding to the width of the printing head, (5) reading out the point binary data of the next column, and (6) continuing to shift the head and readout point binary data column by column, interrupted by head shifts, to print the point binary data of every column up to the $m^{th}$ line of the first column.

2. The process according to claim 1, and the added steps of (7) transmitting said point binary data through a buffer memory for temporary storage, and (8) reading out on a line-by-line basis to said printing head the buffer stored binary data, the read out point binary data belonging to a column as it is being printed and to a line that follows a line which has just been written into the said buffer memory during step (7).

3. The system according to claim 2, and means for operating said buffer memory means in write mode for storing data correspoindng to a column or an integer number of columns or in read mode to feed driving signals to the printing machine, write-read switching means, said line counter means having a data output coupled to a write addressing input of said buffer memory means and an overflow output connected to said write-read switching means for triggering a read mode and a start operation for the printing machine, said write-read switching means switching said buffer memory to a read mode and resetting said line counter responsive to said detecting means detecting a shift of the printing machine.

4. The process according to claim 1, wherein the video signals include signals representing colored areas, the colors of which areas are determined by combinations of primaryl colors, and the added step of:

separately converting said colors into binary code, the data of each primary color being converted according to an algorithm $A_i{}^j$, wherein j identifies the primary color and i is the rank of the point in a horizontal line, and joining with an OR function the converted binary signals corresponding to the primary color data and the rank of a single point, before that point is printed.

5. A process according to claim 4, wherein from any horizontal line to the next horizontal line the algorithm $A_i{}^j$ varies as a function of i.

6. A system for producing two-dimensional steady television pictures from video signals, said system comprising means for continuously digitizing video signals representing said picture, means for extracting line sync pulses and signals frame sync pulses from the television video signal, k-stage register means, buffer memory means having independently controlled input and output operations, means responsive to digitizing clock signals for operating said k-stage shift register means in response to serial input data from an output the digitizing means, said k-stage shift register means having parallel outputs connected to respective inputs of said buffer memory, means for applying buffer memory data outputs to data input of a printing machine having a printing head means with a width of k points, first and second comparator means, two-input AND gate means having one input coupled for receiving clock signals and the other input coupled to an output of said first comparator means, first and second column counter means, one input of said first comparator means being connected to a data output of said first column counter means, and another input of said first comparator means being connected to a data output of said second column counter means, detecting means, the input of the first column counter means being connected to an overflow output of said cyclic k-stage counter driven by the digitizing clock signals and the input of the second column counter means being connected to said detector for detecting an actual shift by the printing machine means, first and second line counter means said first line counter means having data input coupled to receive line sync pulses and a data output coupled to one input of said second comparator means, the output of said second comparator means being coupled to one input of a 3-input AND gate, a second input of said AND gate being coupled to said first comparator means output, and a third input of said AND gate being coupled to the buffer memory output, an output of the 3-input AND gate being coupled to a write control input of the buffer memory means and to an input of said second line counter means, the buffer memory means comprising a busy/idle output indicating a partial busy condition of the memory, said busy/idle output being connected to start control input of the printing machine and to read output connected to a read control output of the printing machine, reset inputs of said first column counter and a cyclic point counter means being fed with said line sync pulses, and a reset input of said first line counter being fed with said frame sync pulses.

7. The system according to either claim 2 or 4 and matrix converter means having n vertical control inputs, said digitizing means sampling chrominance signals in said video signals to deliver signals representing three primary color binary data, and luminance bits, primary color outputs from said digitizing means being coupled to corresponding horizontal inputs of said matrix converter means, crosspoints in said matrix means being selectively located in the converter circuit matrix at selected crossings between horizontal and vertical lines, each of said crosspoints being connected to a corresponding horizontal input when a control input signal is applied to the concerned vertical line, programmable delay register means having an enable input for receiving line sync pulses, n-stage shift register means, the vertical signal being respectively connected from parallel outputs of said n-stage shift register means, a clock input of said n-stage shift from an output of a second 2-input AND gate with one input of said second AND gate receiving digitizing clock signals and the other input of said second AND gate being connected from the output of said programmable delay register menas, a manually controlled input and a clock input on said programmable delay register means for receiving digitizing clock signals, said n-stage shift register means further having an initialization reset input for receiving frame sync pulses, the matrix converter means having an output connected to one input of a third 2-input AND gate, the other input of said third AND gate being connected from a control input, and a output of said third AND gate being connected to one input of a 2-input OR gate, said control input being connected via an inverter, to a fourth 2-input AND gate, the other input of said fourth gate being connected to a luminance output of said digitizing means and the output of said fourth gate being connected to a luminance output of said digitizing means and the output of said fourth gate being connected to the other input of said 2-input OR gate, the output of said 2-input OR gate being connected to said serial input of said k-stage shift register.

* * * * *